(12) United States Patent
Beck et al.

(10) Patent No.: US 9,696,790 B2
(45) Date of Patent: Jul. 4, 2017

(54) POWER MANAGEMENT THROUGH POWER GATING PORTIONS OF AN IDLE PROCESSOR

(71) Applicant: Advanced Micro Devices, Inc., Sunnyvale, CA (US)

(72) Inventors: Noah Beck, Princeton, MA (US); John D. Wilkes, Jr., Bainbridge Island, WA (US); Francisco Leonel Duran, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 236 days.

(21) Appl. No.: 14/523,351

(22) Filed: Oct. 24, 2014

(65) Prior Publication Data

US 2016/0116970 A1 Apr. 28, 2016

(51) Int. Cl.
  *G06F 1/32* (2006.01)
  *G06F 13/24* (2006.01)
  *G06F 9/44* (2006.01)

(52) U.S. Cl.
  CPC .......... *G06F 1/3287* (2013.01); *G06F 1/3228* (2013.01); *G06F 1/3243* (2013.01); *G06F 13/24* (2013.01); *G06F 9/4418* (2013.01); *Y02B 60/1228* (2013.01)

(58) Field of Classification Search
  None
  See application file for complete search history.

(56) References Cited

U.S. PATENT DOCUMENTS

| 7,950,020 | B2 * | 5/2011 | Sun ..................... G06F 12/1441 713/100 |
| 2003/0101362 | A1 * | 5/2003 | Dia ........................ G06F 1/3203 713/300 |
| 2008/0098245 | A1 * | 4/2008 | Hogan .................. G06F 1/3287 713/323 |
| 2011/0106993 | A1 * | 5/2011 | Arinobu .............. G06F 9/45533 710/262 |

* cited by examiner

*Primary Examiner* — Kim Huynh
*Assistant Examiner* — Paul J Yen
(74) *Attorney, Agent, or Firm* — Volpe and Koenig, P.C.

(57) ABSTRACT

Processor power may be managed by executing state storage and power gating instructions after receiving an idle indication. The idle indication may be received while the processor is executing instructions in a first mode, and the processor may execute the state storage and power gating instructions in a second mode. The state storage and power gating instructions may be inaccessible to the processor when operating in the first mode.

16 Claims, 5 Drawing Sheets

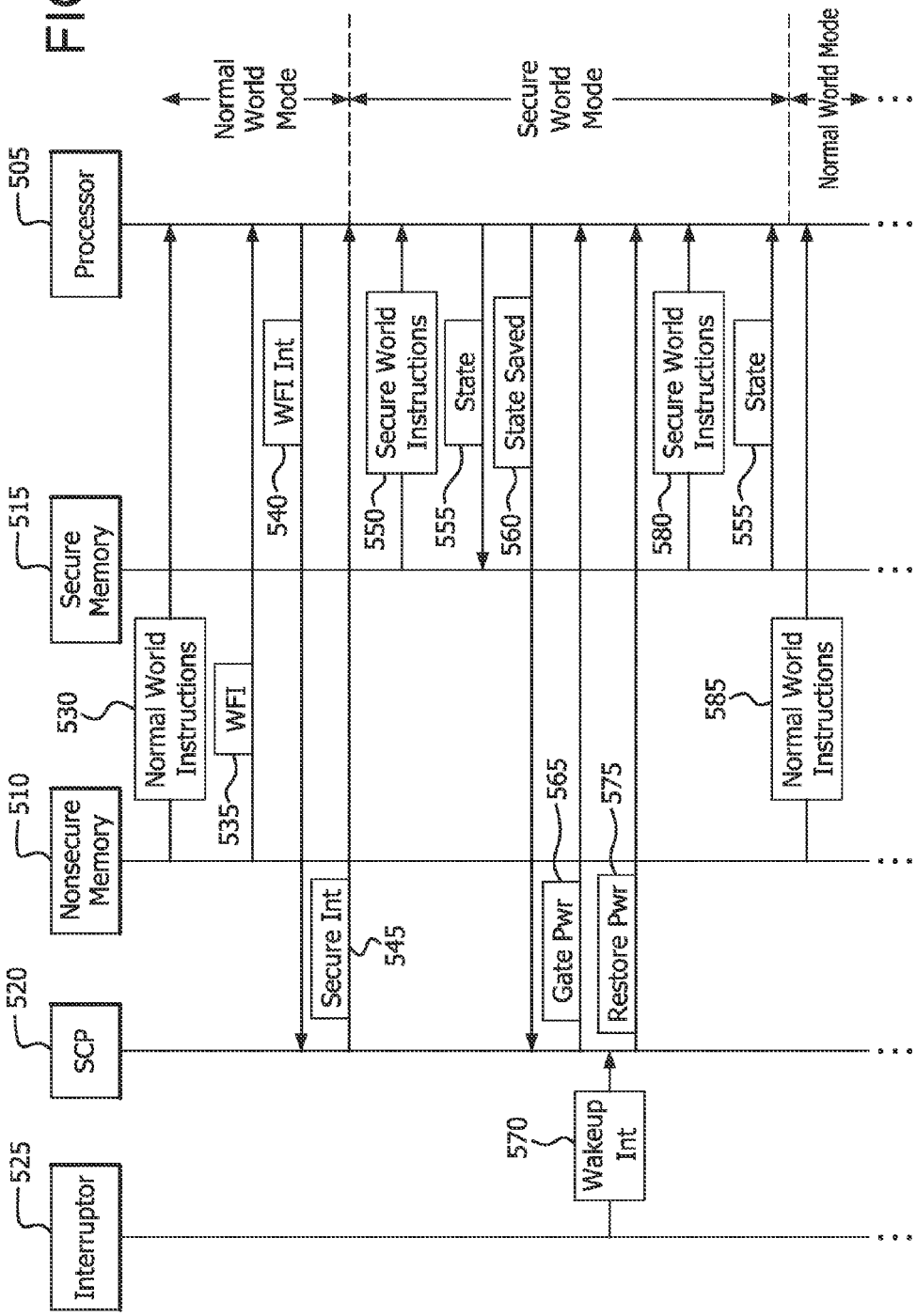

POWER MANAGEMENT THROUGH POWER GATING PORTIONS OF AN IDLE PROCESSOR

FIELD OF THE INVENTION

The present invention is generally directed to power management, and in particular, to power gating in integrated circuits (ICs).

BACKGROUND

During the course of normal operation, a processor and/or portions thereof may spend a significant amount of time waiting for input without performing any other tasks. For example, during execution of instructions a processing unit may execute a halt instruction. In this circumstance the processor may wait for an interrupt or other event prior to continuing with execution. Such events may include elapsed timer indications and input/output (IO) events, or other indications that data is ready. In a basic halt scenario, the processor may simply wait for the event while maintaining power to all of its circuitry.

Because the processor cannot perform such execution tasks while halted apart from waiting and maintaining validity of registers or other volatile data stores, a net savings in power may be achieved under certain circumstances by powering down the processor or parts of the processor during such times.

SUMMARY

Processor power may be managed by executing state storage and power gating instructions after receiving an idle indication. The idle indication may be received while the processor is executing instructions in a first mode, and the processor may execute the state storage and power gating instructions in a second mode. The state storage and power gating instructions may be inaccessible to the processor when operating in the first mode.

BRIEF DESCRIPTION OF THE DRAWINGS

A more detailed understanding may be had from the following description, given by way of example in conjunction with the accompanying drawings.

FIG. 5 is a message sequence chart illustrating example signaling to gate a processor during an idle state.

DETAILED DESCRIPTION

Figure 1:
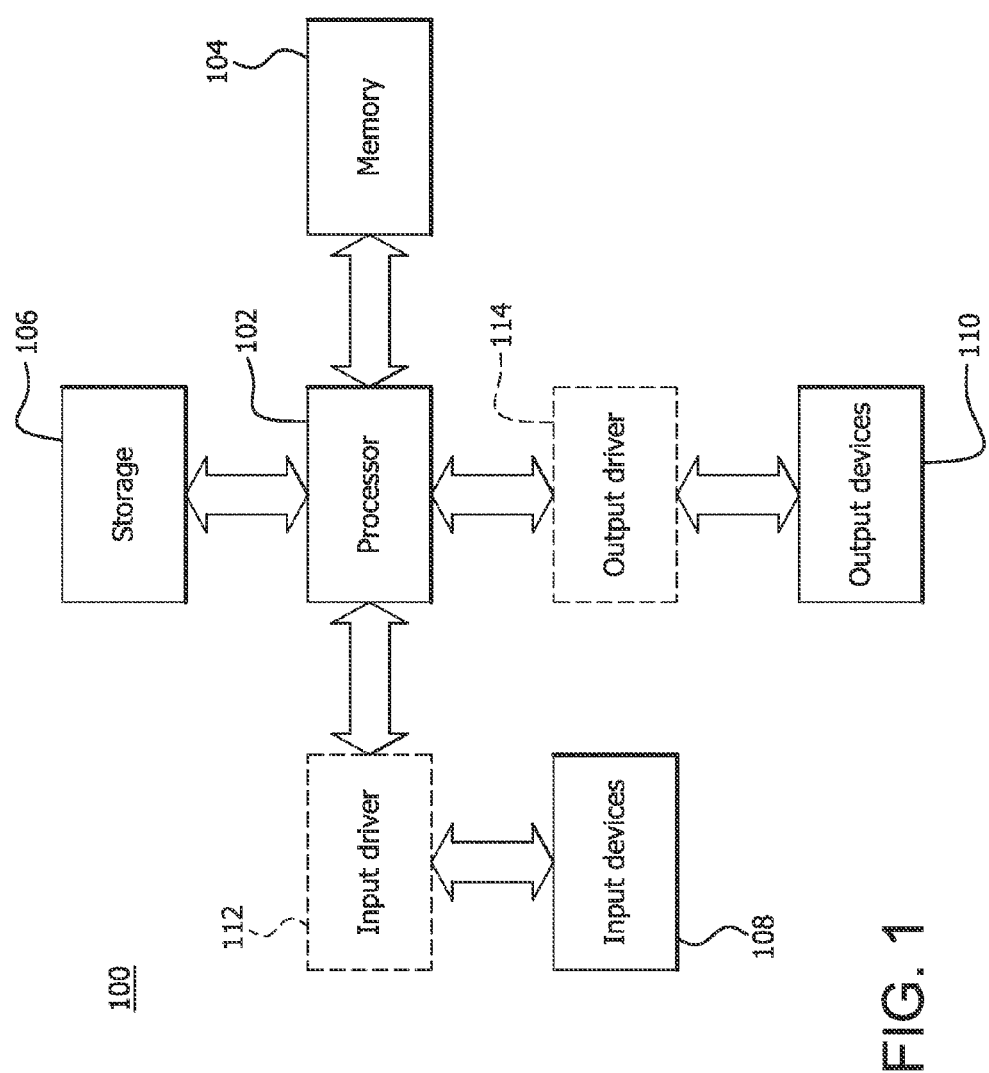
FIG. 1 is a block diagram of an example device in which one or more disclosed embodiments may be implemented.

FIG. 1 is a block diagram of an example device 100 in which one or more example disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include, for example, a central processing unit (CPU), a graphics processing unit (GPU), a CPU and GPU located on the same die, or one or more processor cores, wherein each processor core may be a CPU or a GPU. The processor 102 may also include a system control processor (SCP). The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Techniques described subsequently may apply either to a single processor or processor core, or to a processor containing multiple cores (for example, multiple CPUs, CPUs and GPUs, CPUs and SCPs, and so forth). It is noted that the term processor is used subsequently to refer to any of these.

A processor may be powered down during waiting periods using software. For example, prior to executing a halt command on the processor, an operating system or other software may first execute instructions for saving the architectural state of the processor to a memory outside the processor. Thereafter, the halt instruction may be executed and power to the processor may be gated, i.e., turned off. Upon receiving an interrupt or other indication that the processor should resume executing instructions, power may be restored to the processor and may cause the architectural state of the processor to be reloaded from the memory outside of the processor. Thereafter the processor may resume executing instructions. It is noted that a memory within the processor or processor core may be used for saving the architectural state of the processor so long as power to that section of the processor is not gated, or the memory is nonvolatile.

If the amount of time that power to the processor is gated exceeds a certain amount, a net power savings may be achieved versus an amount of power that would have been consumed by the processor had it not been gated during that time. However performing these tasks in software in an operating system-aware manner may increase complexity and development costs, and may remove some control of the behavior of the processor during halted conditions from the integrated circuit designer.

Some processor architectures may support modifying or adding circuit operations associated with various instructions. For example, in x86 architectures the halt (HLT) and other instructions may be modified using microcode. By adding additional circuit operations to the HLT instruction using microcode, a HLT instruction may be configured to cause the processor to perform all or part of the power gating process, such as saving and restoring its architectural state or gating and restoring power, without operating system participation. In this circumstance, an operating system may need only to issue a HLT instruction to the processor to effect power gating during a halted state, without the need for operating system awareness of the implementation details of the processor, power gating procedure, or architectural state. It is noted that HLT refers to a particular x86 architecture halt instruction herein, while halt instructions generally refer to instructions which cause a processor to wait for an interrupt or other event prior to continuing with execution. Such halt instructions may include wait-for-interrupt (WFI) instructions for example.

However other processor architectures may not support microcode or other modification, editing, or augmentation of circuit operations associated with instructions to a great enough extent (if at all) to implement power gating during halt states using an instruction without further operating system involvement. However it may be desirable to provide for halt state power gating in such processors in a way that does not require operating system awareness.

Some processor architectures that do not support microcode may however support privileged modes of operation. In these environments, stored instructions and data may be designated as secure or nonsecure for example. It is noted that the names for such modes may differ from the descriptions herein. Instructions and data designated as secure may be accessible by the processor only when executing in a particular privileged mode. For example, certain ARM™ processors incorporating TrustZone™ enable a single processor core to function alternately in a normal world mode and a secure world mode. In such processors, power to the processor may be gated following a normal world WFI instruction or other suitable instruction by running secure world code in response to the WFI instruction. Such secure world code may not be visible to an operating system which runs in a normal world mode, and may operate without input from or awareness by either the operating system or other normal world software. Such secure world code may also be supplied as firmware, and may be stored in secure memory which is not accessible to programs running in the normal world mode, such as the operating system. Secure memory and nonsecure memory may be virtual memories within the same physical structure or may be physically separate memories depending upon the desired implementation.

Figure 2:
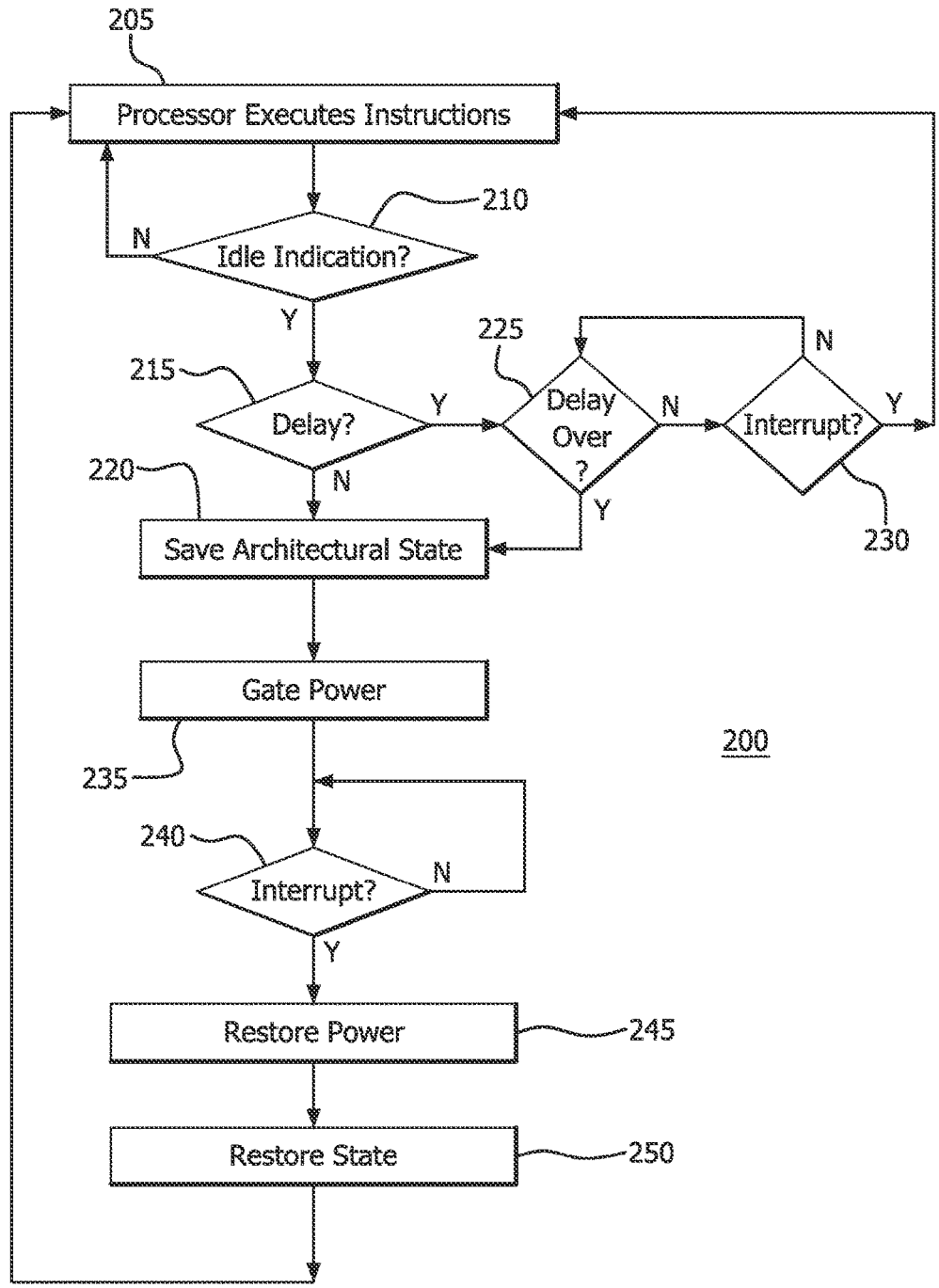
FIG. 2 is a flow chart illustrating example operations for gating power to a processor during an idle state.

FIG. 2 depicts a flow chart 200 illustrating example operations for gating power to a processor or processor core during an idle state.

In a step 205, the processor executes instructions, and continues executing instructions on a condition 210 that it has not received an idle indication. An idle indication may be a halt (e.g. HLT) instruction, wait for interrupt (WFI) instruction, or other instruction or indication that the processor should enter a halted state.

Upon receiving an idle indication, and on a condition 215 that no delay is provided, the processor will save its architectural state in a step 220. A delay may be provided in order to avoid gating power to the processor in circumstances where it is possible that an idle state of the processor would be too short for power gating to provide a net power savings. Such a delay may be appropriate for example during operating conditions where there is a likelihood that if an interrupt or other indication that the processor should return from a halted state has not been received during the delay time, that it is statistically likely that an interrupt or other indication will not be received until power has been gated for a long enough period to yield a net power savings. In some implementations, a delay may not be provided.

Architectural state may include control, general purpose, or any other registers of the processor which hold the state of the processor. Such registers may be volatile memory stores, and saving architectural state may include storing the contents of these volatile memory stores to a memory that is outside the processor, outside the region of the processor to which power will be gated, or is nonvolatile.

On a condition 225 that the delay has elapsed, the processor may proceed to save its architectural state in step 220. On a condition 230 that an interrupt or other indication that the processor should return from a halted state is received before the delay has elapsed, the processor will resume executing instructions in step 205 without saving architectural state or gating power. This may have the advantage of preventing delay and power overhead in situations where the halt state would be too short to realize a net power savings from power gating as discussed above.

After the architectural state has been saved, power to the processor may be gated in a step 235. Power may be gated to the entirety of the processor, or to only a portion of the processor, depending on the desired implementation. For example, a portion of the processor may be maintained in a powered state in order to monitor for an interrupt or other indication that the processor should return from the idle state. In cases where the entire processor is powered down, a system control processor (SCP) or other structure may be implemented to monitor for such indications.

On a condition 240 that an interrupt or other indication that the processor should return from the idle state is received, power is restored to the processor in a step 245, and architectural state is restored to the processor in a step 250. The processor may thereafter continue to execute instructions in step 205.

Figure 3:
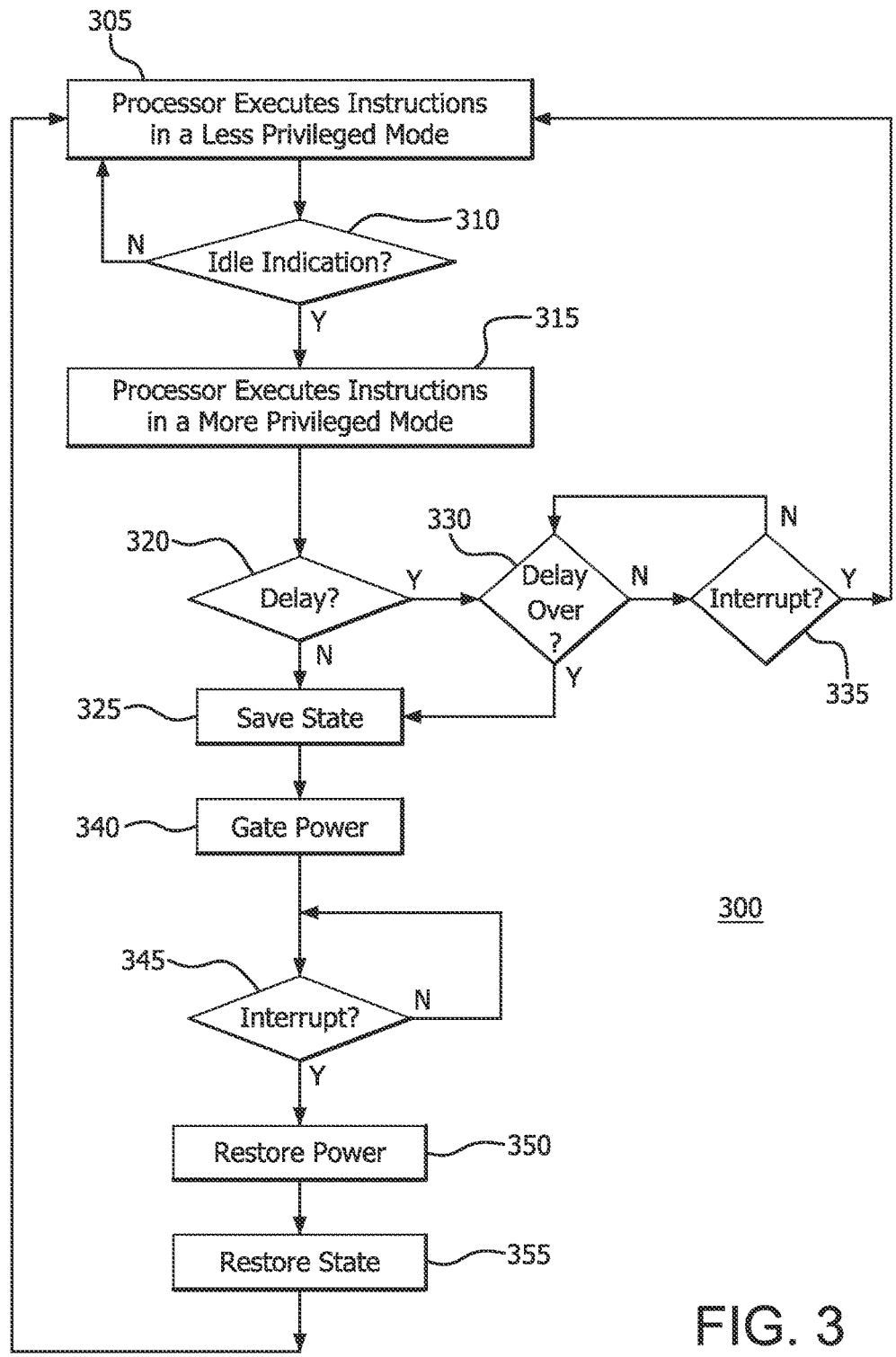
FIG. 3 is a flow chart illustrating other example operations for gating power to a processor during an idle state.

FIG. 3 depicts a flow chart 300 illustrating other example operations for gating power to a processor or processor core during an idle state.

In a step 305, the processor executes instructions in one or more less privileged modes, such as a supervisor mode or hypervisor mode. In this mode, the processor may receive and execute instructions from an operating system or hypervisor, for example, may access non-privileged memory, and may not access privileged memory.

The processor may continue executing instructions in the less privileged mode on a condition 310 that it has not received an idle indication. An idle indication may be a halt (e.g. HLT) instruction, wait for interrupt (WFI) instruction, or other instructions or indications that the processor should enter a halted state. Upon receiving an idle indication, the processor may enter a more privileged mode in a step 315 and execute privileged instructions. Such privileged instructions may be stored in a secure memory which is inaccessible to the operating system or programs running in the less privileged mode.

Executing these privileged instructions, the processor may set a delay timer or otherwise wait for a delay period to elapse before proceeding. On a condition 320 that there is no delay, the processor may proceed to save its architectural state in step 325 as described herein. Otherwise, on a condition 330 that the delay has elapsed, the processor may proceed to save its architectural state in step 325. On a condition 335 that an interrupt or other indication that the processor should return from a halted state is received before the delay has elapsed, the processor will resume executing instructions in step 305 without saving architectural state or gating power. This may have the advantage of preventing delay and power overhead in situations where the halt state would be too short to realize a net power savings from power gating as described herein.

After the architectural state has been saved, power to the processor may be gated in a step 340. Power may be gated to the entirety of the processor or only a portion of the processor depending on the desired implementation. For instance, a portion of the processor may be maintained in a powered state in order to monitor for an interrupt or other indication that the processor should return from the idle state. In cases where the entire processor is powered down, a system control processor (SCP) or other structure may be implemented to monitor for such indications.

On a condition 345 that an interrupt or other indication that the processor should return from the idle state is received, power is restored to the processor in a step 350, and architectural state is restored to the processor in a step 355. The processor may thereafter reenter the less privileged mode and continue to execute less privileged instructions in step 305.

Figure 4:
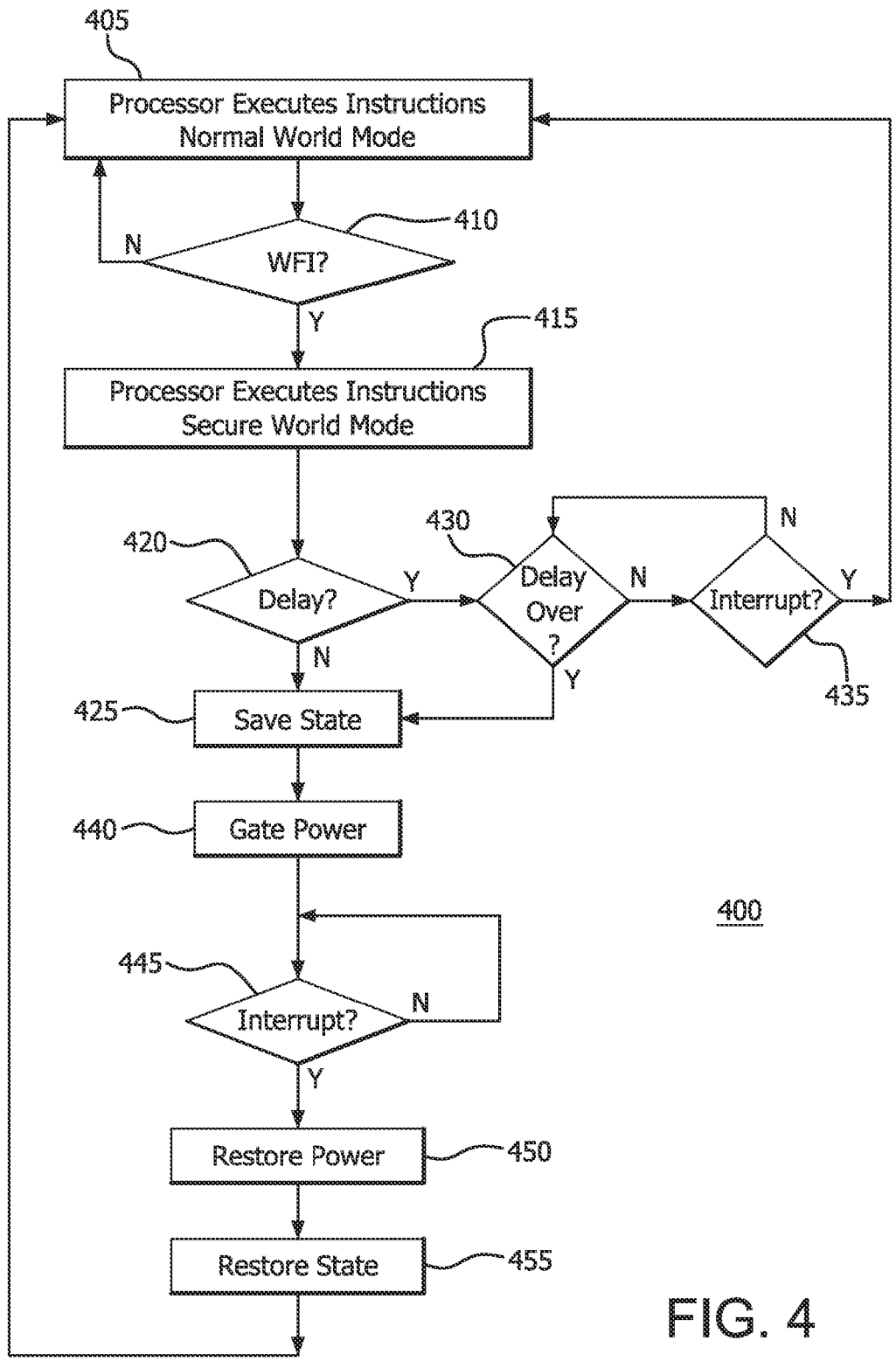
FIG. 4 is a flow chart illustrating further example operations for gating power to a processor during an idle state.

FIG. 4 depicts a flow chart 400 illustrating further example operations for gating power to a processor or processor core during an idle state.

In a step 405, the processor executes instructions in a normal world mode. In this mode, the processor may receive instructions from an operating system or hypervisor, for example, and may access normal world memory. The processor may not access secure world memory in the normal world mode.

The processor may continue executing normal world instructions on a condition 410 that it has not received a wait-for-interrupt (WFI) instruction. Upon receiving and executing a WFI instruction, the processor may enter a secure world mode in a step 415 and execute secure instructions. Such secure world instructions may be stored in a secure world memory and may be inaccessible to the operating system or programs running in the normal world mode. The secure world mode may be a secure monitor mode, in which the processor may receive certain normal world signals, such as nonsecure interrupts.

Executing these secure world instructions, the processor may set a delay timer or otherwise wait for a delay period to elapse before proceeding. On a condition 420 that there is no delay, the processor may proceed to save its architectural state in step 425 as described herein. Otherwise, on a condition 430 that the delay has elapsed, the processor may proceed to save its architectural state in step 425. On a condition 435 that an interrupt which indicates that the processor should return from a halted state is received before the delay has elapsed, the processor will resume executing instructions in step 405 without saving architectural state or gating power. This may have the advantage of preventing delay and power overhead in situations where the halt state would be too short to realize a net power savings from power gating as described herein. It is noted that the interrupt may be a secure interrupt or a nonsecure interrupt depending upon the desired implementation.

After the architectural state has been saved, power to the processor may be gated in a step 440. Power may be gated to the entirety of the processor or only a portion of the processor depending on the desired implementation. For instance, a portion of the processor may be maintained in a powered state in order to monitor for an interrupt or other indication that the processor should return from the idle state. In cases where the entire processor is powered down, a system control processor (SCP) or other structure may be implemented to monitor for such indications.

On a condition 445 that an interrupt or other indication that the processor should return from the idle state is received, power may be restored to the processor in a step 450, and architectural state may be restored to the processor in a step 355. The processor may thereafter reenter the normal world mode and continue to execute normal world instructions in step 405.

FIG. 5 is a message sequence chart 500 illustrating example signaling to gate a processor or processor core during an idle state in a way that is invisible to the operating system. The signaling in sequence chart 500 occurs among a processor 505, nonsecure memory 510, secure memory 515, system control processor (SCP) 520, interrupter 525, and an operating system (not shown), although it is noted that other components may be used depending upon the desired implementation. Secure memory 515 and nonsecure memory 510 may be virtual memories within the same physical structure or may be physically separate memories depending upon the desired implementation. It is also noted that the SCP and processor may be implemented on the same die or on different dies depending on the desired implementation, and that other control structures may be used instead of an SCP.

Sequence 500 begins with processor 505 executing normal world instructions 530 from nonsecure memory 510 in a normal world mode. The normal world instructions may be data processing instructions or any other suitable normal world processor tasks. Nonsecure memory 510 and normal world instructions 530 are visible to the operating system.

In response to receiving a WFI instruction 535 from nonsecure memory 510 during execution, processor 505 sends an interrupt 540 to SCP 520 and halts processing. In this example, interrupt 540 is an interrupt from the perspective of the SCP, and may be simply a wire, flag, or other indication set by processor 505 upon receipt of a WFI instruction. In some implementations other instructions or events (not shown) that require halting of the processor 505 may halt processor 505 and cause an interrupt 540.

After receiving interrupt 540, SCP 520 sends a secure interrupt 545 to processor 505. In response to receiving secure interrupt 545, processor 505 enters a secure monitor mode and begins to execute secure world instructions 550 from secure memory 515. Secure world instructions 550 and secure memory 515 are not visible to the operating system.

It is noted that a delay may implemented, for example, between reception of interrupt 540 by SCP 520 and transmitting secure interrupt 545 to processor 505, in order to avoid gating power to the processor in circumstances where it is possible that an idle state of the processor would be too short for power gating to provide a net power savings. Such a delay may be appropriate for example during operating conditions where there is a likelihood that if an interrupt or other indication that the processor should return from a halted state has not been received during the delay time, that it is statistically likely that an interrupt or other indication will not be received until power has been gated for a long enough period to yield a net power savings. In some implementations, a delay may not be provided, and such a delay is omitted from FIG. 5 for clarity.

Secure world instructions 550 cause processor 505 to save its architectural state 555 to secure memory 515. After saving architectural state 555, processor 505 sends a state saved indication 560 to SCP 520, which in turn issues a message 565 gating power to processor 505 or otherwise causing power to be gated to processor 505.

Subsequently, an interrupter 525 issues or causes a wakeup interrupt 570, which is received by SCP 520. Such an interrupt may be due to data becoming ready for processing or another occurrence which would require processor 505 to become active. Interrupter 525 may be an input, output, or storage device, or an intermediary device between such devices and the SCP 520 such as a global interrupt controller (GIC) (not shown). A GIC, for example, may translate a device interrupt into a wakeup interrupt if the processor 505 is not already awake.

After receiving wakeup interrupt 570, SCP 520 issues a message 575 to processor 505 or another structure to cause power to be restored to processor 505. Processor 505 then executes additional secure world instructions 580 which cause the processor to restore its architectural state 555 from secure memory 515 and resume normal world processing. Thereafter, processor 505 proceeds to execute normal world instructions 585 from nonsecure memory 510 in a normal world mode.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for power management, the method comprising:
   executing first instructions on a processor in a first mode; and
   on a condition that an idle indication is received by the processor, executing second instructions on the processor in a second mode which cause the processor to save a state of the processor to a state memory and turn off power to at least a portion of the processor, wherein the second mode is an idle mode;
   wherein the second instructions are accessible to the processor only on a condition that the processor is operating in the second mode; and
   wherein the second instructions are stored in a secure memory.

2. The method of claim 1, wherein executing the second instructions on the processor causes the processor, on a condition that a wake indication is received by the processor, to restore power to the processor and to restore the state to the processor.

3. The method of claim 1, further comprising:
   on the condition that the idle indication is received, transmitting an indication that the idle indication has been received; and,
   on a condition that an interrupt is received in response to the indication that the idle indication has been received, causing the processor to enter the second mode and execute the second instructions.

4. The method of claim 1, wherein the first mode is a normal world mode wherein the processor cannot access a secure memory, and the second mode is a secure world mode wherein the processor can access the secure memory.

5. The method of claim 1, wherein the second mode is a secure monitor mode.

6. The method of claim 1, wherein the idle indication is a wait for interrupt (WFI) instruction.

7. The method of claim 1, wherein the idle indication is a halt instruction.

8. An integrated circuit (IC) comprising:
   a processor configured to execute first instructions from a first memory in a first mode and, on a condition that an idle indication is received by the processor, to execute second instructions from a second memory in a second mode;
   the IC configured such that the second instructions cause the processor to save a state of the processor to a state memory and power to at least a portion of the processor to be turned off, wherein the second mode is an idle mode;
   the IC further configured such that the second instructions are accessible to the processor only on a condition that the processor is operating in the second mode; and
   wherein the second instructions are stored in a secure memory.

9. The IC of claim 8, further configured such that executing the second instructions on the processor causes the IC, on a condition that a wake indication is received by the processor, to restore power to the processor and to restore the state to the processor.

10. The IC of claim 8, wherein the processor is configured such that:
   on the condition that the idle indication is received, an indication that the idle indication has been received is transmitted; and,
   on a condition that an interrupt is received in response to the indication that the idle indication has been received, the processor enters the second mode and executes the second instructions.

11. The IC of claim 8, configured such that first mode is a normal world mode wherein the processor cannot access a secure memory, and the second mode is a secure world mode wherein the processor can access the secure memory.

12. The IC of claim 8, configured such that the second mode is a secure monitor mode.

13. The IC of claim 8, configured such that the idle indication is a wait for interrupt (WFI) instruction.

14. The IC of claim 8, configured such that the idle indication is a halt instruction.

15. A non-transitory computer-readable storage medium having stored thereon instructions for execution by a processor which cause the processor, on a condition that an idle indication is received by the processor, to:
- save a state of the processor to a memory and to turn off power to at least a portion of the processor;
- wherein the idle indication is received by the processor in a first mode;
- wherein the instructions are executed by the processor in a second mode, wherein the second mode is an idle mode; and
- wherein the instructions are accessible to the processor only on a condition that the processor is operating in the second mode; and
- wherein the instructions are stored in a secure memory.

16. The storage medium of claim 15, wherein the idle indication is a halt instruction, the first mode is a normal world mode, and the second mode is a secure world mode.

\* \* \* \* \*